S. H. MORTIMER & V. R. BOTTONE.
ELECTRIC STORAGE BATTERY.
APPLICATION FILED MAR. 11, 1914.
1,201,074.
Patented Oct. 10, 1916.
2 SHEETS—SHEET 1.
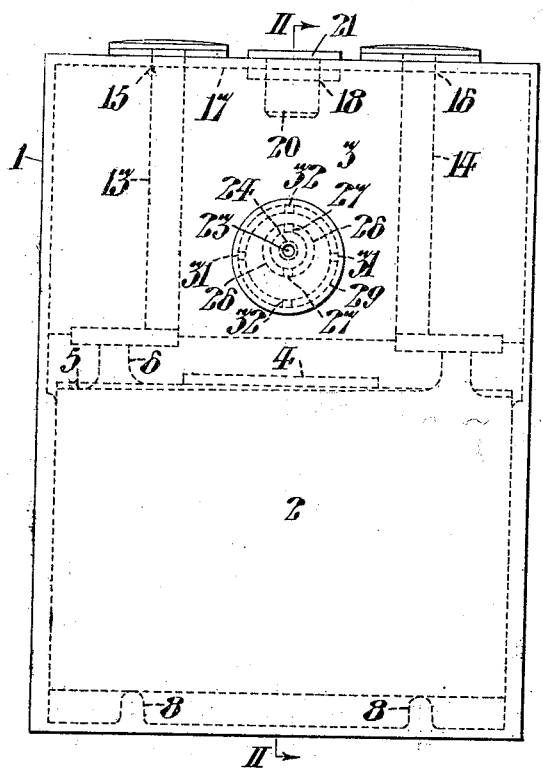
FIG. I.
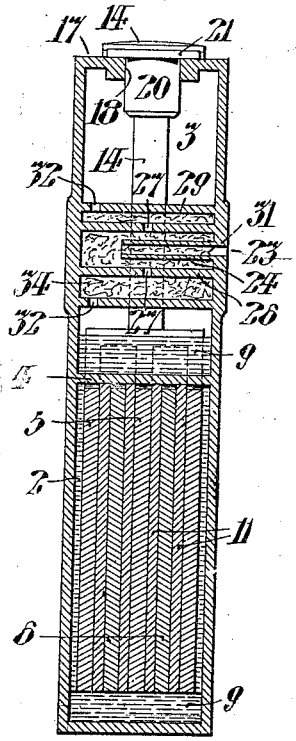
FIG. II.
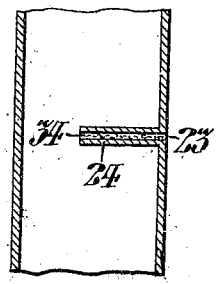
FIG. III.
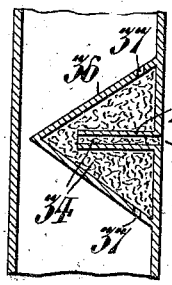
FIG. IV.
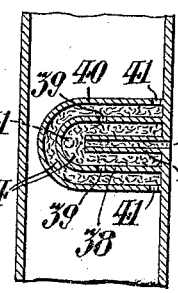
FIG. V.
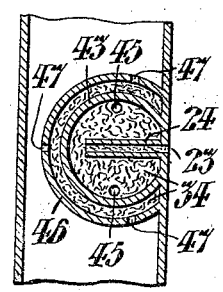
FIG. VI.
WITNESSES:
Philip W. Vessey
Joseph C. Segal
INVENTORS.
Stockton Heth Mortimer
and Victor Robis Bottone,
by Arthur E. Paige
Attorney.

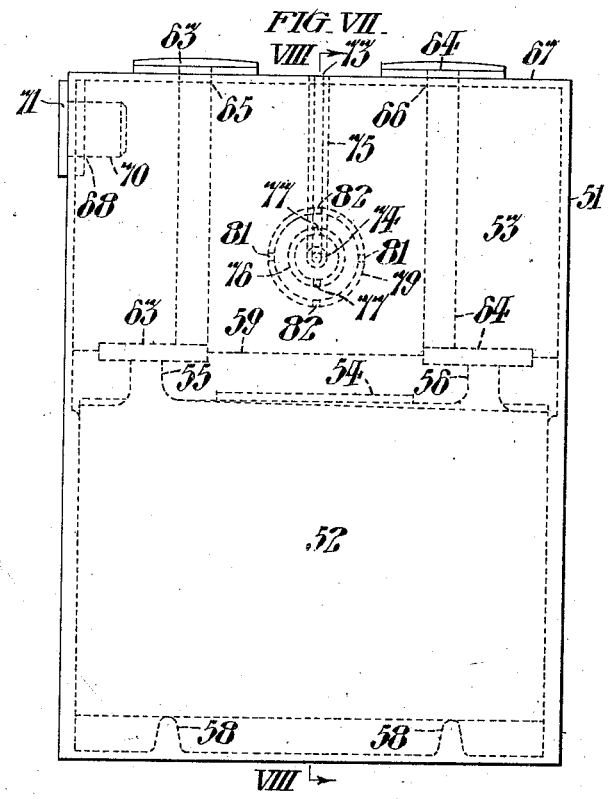
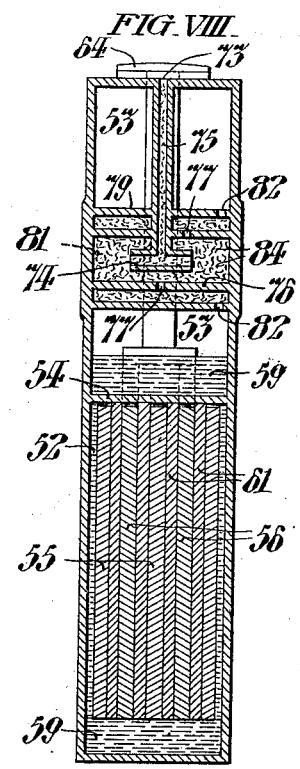
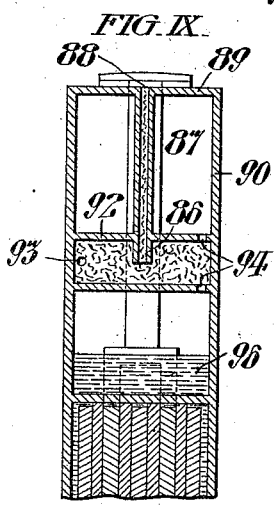
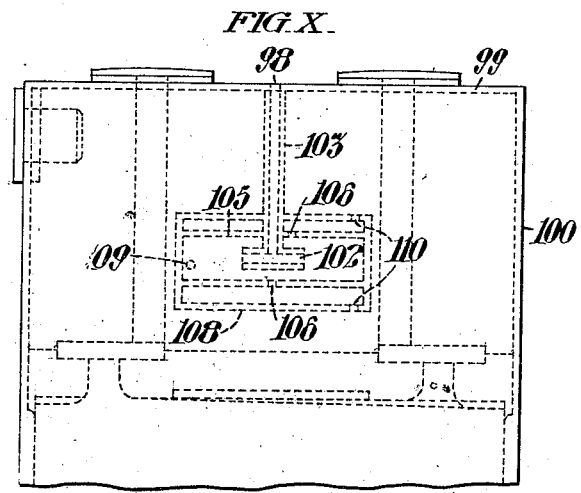

UNITED STATES PATENT OFFICE.

STOCKTON HETH MORTIMER AND VICTOR ROLES BOTTONE, OF PHILADELPHIA, PENNSYLVANIA.

ELECTRIC STORAGE BATTERY.

1,201,074.

Specification of Letters Patent.

Patented Oct. 10, 1916.

Application filed March 11, 1914. Serial No. 824,043.

*To all whom it may concern:*

Be it known that we, STOCKTON HETH MORTIMER, a citizen of the United States, and VICTOR ROLES BOTTONE, a citizen of England, both residents of Philadelphia, in the county of Philadelphia and State of Pennsylvania, have invented a certain new and useful Improvement in Electric Storage Batteries, whereof the following is a specification, reference being had to the accompanying drawings.

Our invention relates to batteries which are adapted for employment in miners' and inspection lamps, signaling devices, or other embodiments where batteries may be violently shaken or inverted. Such batteries include cells or outer casings which are substantially closed to prevent spilling the electrolyte. However, as gas is formed by electrolytic action within such casings, the latter must be provided with means to permit the escape of such gas.

Therefore, it is an object of our invention to provide such a storage battery with a casing having a vent device permitting the escape of gas without permitting the escape of the liquid electrolyte, regardless of the inversion of said casing.

As hereinafter described, our invention includes an electric storage battery having an invertible casing containing a plate compartment in its lower portion and a gas compartment in its upper portion; plates in said plate compartment having terminals extending exterior to said casing; a liquid electrolyte in said plate compartment, but in communication with said gas compartment; and a vent device including an outer opening in the wall of said casing, and a plurality of conduit members, extending one within the other, forming a tortuous passageway in communication with said vent opening, and opening at its inner end into said gas compartment; so constructed and arranged with reference to the quantity of said electrolyte that the latter is normally prevented from reaching the open outer end of said vent conduit, through which the gas escapes.

In the most complex form of our invention hereinafter described, said conduit members are perforated cylindrical tubes extending transversely in the battery casing in relatively eccentric relation and with the innermost tube communicating with the vent opening through the top wall of said casing; such communication being by way of a vertical tube extending from said inner tube through said other tubes, transversely to the axes thereof.

Our invention includes the various novel features of construction and arrangement hereinafter more definitely specified.

In the drawings, Figure I is a front elevation of a storage battery conveniently embodying our invention. Fig. II is a central vertical sectional view of said battery, taken on the line II, II, in Fig. I. Figs. III, IV, V and VI are fragmentary sectional views, similar to Fig. II, but showing modified forms of our invention. Fig. VII is a front elevation of a battery embodying a modified form of our invention, being the most complex form thereof above contemplated. Fig. VIII is a central vertical sectional view of said battery, taken on the line VIII, VIII in Fig. VII. Fig. IX is a fragmentary vertical sectional view, similar to Fig. VIII but showing a simplified form of our invention. Fig. X is a fragmentary front elevation of a battery embodying a modified form of our invention.

The storage battery shown in Figs. I and II includes the invertible rectangular casing 1 containing the plate compartment 2 in its lower portion and the gas compartment 3 in its upper portion. The partition 4 which is in rigid relation with said casing 1, between said two compartments, permits fluid communication between them. The plates 5 and 6 in said plate compartment 2 are held by said partition 4 upon the supporting ribs 8, at the bottom of said casing, which permit the flow of liquid acid electrolyte 9 beneath said plates, which are held in separated relation by the porous separators 11 which are preferably formed of wood deprived of such of its constituents as might interfere with the electrolytic action or efficiency of the battery. Said electrolyte 9 extends above said partition 4 and in communication with said gas compartment 3. Said plates are held in assembled relation as shown, by their respective terminals 13 and 14 which extend exterior to said casing 1 through the respective openings 15 and 16 in the lid 17 of said casing. Said lid 17 has the central opening 18, through which the electrolyte 9 may be introduced and removed; said opening being normally closed by the plug 20 having the head 21 which may be sealed exterior to said lid. Said lid 17 is primarily separate from said casing 1, but is cemented in integral relation therewith, so as to form the top wall thereof, as shown in Figs. I and II. Said casing 1 has the vent device including the outer vent opening 23 in a vertical wall of said casing 1 extending parallel with said plates 11, as shown in Fig. II. The inner tube 24, in communication with said outer vent opening 23, extends horizontally in said gas compartment 3 transversely with respect to the planes of said plates 11 and above the latter; the inner end of said tube 24 terminating in spaced relation with a wall on said casing apposed to said wall having said vent opening. The intermediate tube 26 surrounds said inner tube 24, in concentric relation therewith, and is rigidly connected at its opposite ends to said apposed walls; said intermediate tube having perforations 27 at the top and bottom thereof, in vertical alinement, intermediate of its length, as shown in Fig. II. The outer tube 29 which surrounds said inner and intermediate tubes, in eccentric relation therewith as shown in Fig. I, and is rigidly connected at its opposite ends to said apposed walls; has perforations 31 at opposite sides thereof, in horizontal alinement, adjoining said wall having said vent opening 23, and perforations 32 at the top and bottom thereof, in vertical alinement, adjoining said apposed wall.

It may be observed that the perforated cylindrical tubes 24, 26 and 29 above described form a conduit for the escape of the gas from said gas compartment 3 to the outer atmosphere, such conduit beginning with the perforations in said outer tube 29 and ending with the vent opening 23. Said inner tube 24 is of such length, with reference to the quantity of the electrolyte 9, that the latter could not reach the open inner end of said tube 24 even if the other surrounding tubes, 26 and 29 were omitted. Consequently, said liquid 9 can only be caused to enter the inner end of said tube 24 by splashing. Therefore, we may include splash preventing material 34 in and between said tubes, although said casing 1 is impermeable to the liquid 9 under normal conditions of use or misuse even when such material is omitted. Said material 34 may be porous.

Although we prefer to form the gas vent device above described of tubular conduit members extending one within the other and in the eccentric relation described, because such construction and arrangement has been found more efficient for the purpose contemplated than the other forms hereinafter described, it is to be understood that our invention may be embodied in other forms. For instance, as shown in Fig. III, the vent conduit may consist solely of the inner tube 24; the other surrounding tubes being omitted, as above contemplated; said tube being filled with porous material 34 or not. However, it is to be understood that we prefer to surround said inner tube with an inclosure of some sort, although such inclosure does not necessarily rigidly connect the apposed walls of the casing as in the form of our invention shown in Figs. I and II. For instance, as shown in Fig. IV, the inner tube 24 may be surrounded by the inclosure 36 having the perforations 37, and such inclosure may be a cone or a pyramid with a quadrangular base.

As shown in Fig. V, the inner tube 24 is surrounded by the intermediate inclosure 38 having the perforations 39, and the outer inclosure 40 having the perforations 41; said inclosures being cylindrical with hemispherical ends. As shown in Fig. VI, the inner tube 24 may be surrounded by two concentric spherical inclosures; the intermediate inclosure 43 having the perforations 45, and the outer inclosure 46 having the perforations 47.

The storage battery shown in Figs. VII and VIII includes the invertible rectangular casing 51 containing the plate compartment 52 in its lower portion and the gas compartment 53 in its upper portion. The partition 54 which is in rigid relation with said casing 51, between said two compartments, permits fluid communication between them. The plates 55 and 56 in said plate compartment 52 are held by said partition 54 upon the supporting ribs 58, at the bottom of said casing, which permit the flow of liquid acid electrolyte 59 beneath said plates, which are held in separated relation by the wood separators 61 which are like the separators 11 aforesaid. Said electrolyte 59 extends above said partition 54 and in communication with said gas compartment 53, as shown in Fig. VIII. Said plates are held in assembled relation as shown, by their respective terminals 63 and 64 which extend exterior to said casing 51 through the respective openings 65 and 66 in the lid 67 of said casing. Said lid 67 is primarily separate from said casing 51 but is cemented in integral relation therewith, so as to form the top wall thereof, as shown in Figs. VII and VIII. Said casing 51 has the opening 68 through which the electrolyte 69 may be introduced and removed; said opening being normally closed by the plug 70 having the head 71 which may be sealed exterior to said casing. Said casing 51 has the vent device including the outer vent opening 73 in said top wall or lid 67 of the casing; which opening is in communication with the inner tube 74 by way of the vertical tube 75. Both ends of said inner tube 74 terminate in such spaced relation with the adjacent walls of the casing 51 that the electrolyte 59 cannot reach them except by splashing, as above contemplated. The intermediate tube 76 surrounds said inner tube 74, in concentric relation therewith, and is rigidly connected at its opposite ends to the walls of said casing; said intermediate tube having perforations 77 at the top and bottom thereof, intermediate of its length, as shown in Fig. VIII. The outer tube 79 which surrounds said inner and intermediate tubes, in eccentric relation therewith, like the tube 29 above described, or in concentric relation therewith as shown, and is rigidly connected at its opposite ends to said casing walls; has perforations 81 at opposite sides thereof, in horizontal alinement, adjoining one of said walls, and perforations 82 at the top and bottom thereof, in vertical alinement, adjoining said other wall. Said tubes 74, 75, 76 and 77 form a conduit for the escape of gas from said gas compartment 53 to the outer atmosphere, such conduit beginning with the perforations in said outer tube 77 and ending with the vent opening 73. We prefer to include porous, splash preventing material 84, in and between said tubes, although said casing 51 is impervious to the liquid 59 under normal conditions of use or misuse even when said porous material 84 is omitted.

Although in the forms of our invention above described, we have shown the inner tube of the vent device extending transversely with respect to the battery casings, it is to be understood that it may be otherwise disposed. For instance, as shown in Fig. IX, the inner tube 86 extends vertically, in alinement with the tube 87 by which it is connected in communication with the outer vent opening 88 in the lid or top wall 89 of the casing 90, which is otherwise like the casing 51 above described. Said inner tube 86 is inclosed by the tube 92 which extends transversely in said casing 90 in rigid relation with the opposite vertical walls thereof and has perforations 93 and 94 respectively adjoining said walls. It may be observed that said inclosing tube 92 may be omitted, provided that the open end of said inner tube 86 is in such spaced relation with the walls of said casing 90 that the liquid electrolyte 96 cannot be tilted into it.

In Fig. X we have shown a modified form of our invention, which is similar to Fig. VIII except that the conduit tubes which extend one within the other are disposed with their axes parallel with the plane of the plates instead of transversely with respect thereto as in Fig. VIII. In this form of our invention, the outer vent opening 98 in the lid or top wall 99 of the casing 100 is in communication with the inner tube 102 by way of the vertical tube 103; and said inner tube is inclosed by the intermediate tube 105 having the perforations 106 respectively at the top and bottom thereof. Said inner tube 102 and intermediate tube 105 are surrounded by the outer inclosure 108 having a pair of perforations 109, in horizontal alinement, at one end, and a pair of perforations 110 in vertical alinement at the other end. It is to be understood that the tortuous passageway formed by the tubes of said vent device, may be filled with porous, splash preventing material.

It may be observed that the form of our invention shown in Fig. X is the most complex form thereof which we have chosen for illustration but is advantageous in that the entire vent device is carried by the lid 99 and may be assembled in connection therewith before said lid is cemented in connection with the casing 100.

It is to be noted that the essential feature of our invention, which is embodied in each of the different forms thereof above described, is a conduit opening at its inner end into the gas compartment of the battery casing and leading to the outer atmosphere, through which the gas formed by the electrolytic action within the battery casing may escape, but which is so constructed and arranged with reference to the quantity of the liquid electrolyte in the battery, that said liquid is normally prevented from reaching the open outer end of said vent conduit through which the gas escapes. Therefore, we do not desire to limit ourselves to the precise details of construction and arrangement herein set forth, as it is obvious that various modifications may be made therein without departing from the essential features of our invention as defined in the appended claims.

We claim:—

1. An electric storage battery including an invertible rectangular casing containing a plate compartment in its lower portion and a gas compartment in its upper portion; a partition between said compartments permitting fluid communication between them; plates in said plate compartment held in operative position by said partition and having terminals extending exterior to said casing; a liquid acid electrolyte in said casing, covering said plates, extending above said partition, and in communication with said gas compartment; the quantity of said electrolyte being so limited that it cannot trap gas at the vent, in any position to which said casing may be turned; a vent device including an opening in one of the vertical walls of said casing extending parallel with said plates, an inner tube in communication with said opening extending horizontally in said gas compartment, transversely with respect to the planes of said plates, and above the latter; the inner end of said tube terminating in spaced relation with a wall of said casing apposed to the wall having said opening, an intermediate tube, surrounding said inner tube, in concentric relation therewith, rigidly connected at its opposite ends to said apposed walls; said intermediate tube having perforations at the top and bottom thereof, in vertical alinement, intermediate of its length; an outer tube, surrounding said inner and intermediate tubes, in eccentric relation therewith, rigidly connected at its opposite ends to said apposed walls, having perforations at opposite sides thereof, in horizontal alinement, adjoining said wall having said vent opening, and perforations at the top and bottom thereof, in vertical alinement, adjoining said apposed wall; and porous, splash preventing, material in and between said tubes; whereby gas arising in said gas chamber from electrolytic action in said casing may escape through the tortuous passageway beginning with the perforations in said outer tube and terminating with said vent opening to the atmosphere from said inner tube, but without permitting the escape of the electrolyte, regardless of the inversion of said casing.

2. An electric storage battery including an invertible casing containing a plate compartment in its lower portion and a gas compartment in its upper portion; plates in said plate compartment having terminals extending exterior to said casing; a liquid electrolyte in said casing, covering said plates, in communication with said gas compartment; the quantity of said electrolyte being so limited that it cannot trap gas at the vent, in any position to which said casing may be turned; a vent device including an opening in a vertical wall of said casing, an inner tube in communication with said opening extending horizontally in said gas compartment, above said plates; the inner end of said tube terminating in spaced relation with a wall of said casing; an intermediate tube, surrounding said inner tube, rigidly connected at its opposite ends to said casing walls; said intermediate tube having perforations at the top and bottom thereof, in vertical alinement, intermediate of its length; an outer tube, surrounding said inner and intermediate tubes, in eccentric relation therewith, rigidly connected at its opposite ends to said casing walls, having perforations at opposite sides thereof, in horizontal alinement, adjoining said wall having said vent opening, and perforations at the top and bottom thereof, in vertical alinement, adjoining the apposed wall; whereby gas arising in said gas chamber from electrolytic action in said casing may escape through the tortuous passageway beginning with the perforations in said outer tube and terminating with said vent opening to the atmosphere from said inner tube, but without permitting the escape of the electrolyte, regardless of the inversion of said casing.

3. An electric storage battery including an invertible casing containing a plate compartment in its lower portion and a gas compartment in its upper portion; plates in said plate compartment having terminals extending exterior to said casing; a liquid electrolyte in said casing, in communication with said gas compartment; the quantity of said electrolyte being so limited that it cannot trap gas at the vent, in any position to which said casing may be turned; a vent device including an opening in a vertical wall of said casing; an inner tube in communication with said opening and extending horizontally in said gas compartment, above said plates; the inner end of said tube communicating with said gas compartment; an intermediate tube, surrounding said inner tube, rigidly connected to said casing; said intermediate tube having perforations at the top and bottom thereof, in vertical alinement, intermediate of its length; an outer tube, surrounding said inner and intermediate tubes, in eccentric relation therewith, and rigidly connected to said casing, having perforations at opposite sides thereof, in horizontal alinement, at one end, and perforations at the top and bottom thereof, in vertical alinement, at its other end; whereby gas arising in said gas chamber from electrolytic action in said casing may escape through the tortuous passageway beginning with the perforations in said outer tube and terminating with said vent opening to the atmosphere from said inner tube, but without permitting the escape of electrolyte, regardless of the inversion of said casing.

4. An electric storage battery including an invertible casing containing a plate compartment in its lower portion and a gas compartment in its upper portion; plates in said plate compartment having terminals extending exterior to said casing; a liquid electrolyte in said casing, in communication with said gas compartment; the quantity of said electrolyte being so limited that it cannot trap gas at the vent, in any position to which said casing may be turned; a vent device including an opening in a wall of said casing; an inner tube in communication with said opening extending in said gas compartment, in communication therewith; an intermediate tube, surrounding said inner tube, rigidly connected to said casing; said intermediate tube having perforations at the top and bottom thereof, in vertical alinement, intermediate of its length: an outer tube, surrounding said inner and intermediate tubes, and rigidly connected to said casing, having perforations at opposite sides thereof, in horizontal alinement, at one end, and perforations at the top and bottom thereof, in vertical alinement, at its other end; whereby gas arising in said gas chamber from electrolytic action in said casing may escape through the tortuous passageway beginning with the perforations in said outer tube and terminating with said vent opening to the atmosphere from said inner tube, but without permitting the escape of electrolyte, regardless of the inversion of said casing.

5. An electric storage battery including an invertible casing containing a plate compartment in its lower portion and a gas compartment in its upper portion; plates in said plate compartment having terminals extending exterior to said casing; a liquid electrolyte in said casing, in communication with said gas compartment; the quantity of said electrolyte being so limited that it cannot trap gas at the vent, in any position to which said casing may be turned; a vent device including an opening in a wall of said casing; an inner tube in communication with said opening extending in said gas compartment, in communication therewith; another tube, surrounding said inner tube, rigidly connected to said casing; said other tube having perforations at the top and bottom thereof, in vertical alinement, intermediate of its length; whereby gas arising in said gas chamber from electrolytic action in said casing may escape through the tortuous passageway beginning with the perforations in said outer tube and terminating with said vent opening to the atmosphere from said inner tube, but without permitting the escape of the electrolyte, regardless of the inversion of said casing.

6. An electric storage battery including an invertible casing containing a plate compartment in its lower portion and a gas compartment in its upper portion; plates in said plate compartment having terminals extending exterior to said casing; a liquid electrolyte in said casing, in communication with said gas compartment; the quantity of said electrolyte being so limited that it cannot trap gas at the vent, in any position to which said casing may be turned; a vent device including an opening in a wall of said casing; an inner tube in communication with said opening extending in said gas compartment, in communication therewith; an outer tube, surrounding said inner tube, and rigidly connected to said casing, having perforations at opposite sides thereof, in horizontal alinement, at one end, and perforations at the top and bottom thereof, in vertical alinement, at its other end; whereby gas arising in said gas chamber from electrolytic action in said casing may escape through the tortuous passageway beginning with the perforations in said outer tube and terminating with said vent opening to the atmosphere from said inner tube, but without permitting the escape of the electrolyte, regardless of the inversion of said casing.

7. An electric storage battery including an invertible casing containing a plate compartment in its lower portion and a gas compartment in its upper portion; plates in said plate compartment having terminals extending exterior to said casing; a liquid electrolyte in said casing, in communication with said gas compartment; the quantity of said electrolyte being so limited that it cannot trap gas at the vent, in any position to which said casing may be turned; a vent device including an opening in a wall of said casing; an inner tube in communication with said opening extending in said gas compartment, in communication therewith; an inclosure surrounding said inner tube, and rigidly connected to said casing, having perforations at the top and bottom thereof; whereby gas arising in said gas chamber from electrolytic action in said casing may escape through the tortuous passageway beginning with the perforations in said outer tube and terminating with said vent opening to the atmosphere from said inner tube, but without permitting the escape of electrolyte, regardless of the inversion of said casing.

8. An electric storage battery including an invertible casing containing a plate compartment in its lower portion and a gas compartment in its upper portion; plates in said plate compartment having terminals extending exterior to said casing; a liquid electrolyte in said casing, in communication with said gas compartment; the quantity of said electrolyte being so limited that it cannot trap gas at the vent, in any position to which said casing may be turned; a vent device including an opening in a wall of said casing; an inner tube in communication with said opening extending horizontally in said gas compartment, in communication therewith; the inner end of said tube terminating in spaced relation with the wall of said casing apposed to the wall having said opening; an inclosure surrounding said inner tube, and rigidly connected to said casing having perforations at the top and bottom thereof; whereby gas arising in said gas chamber from electrolytic action in said casing may escape through the tortuous passageway beginning with a perforation in said inclosure and terminating with said vent opening to the atmosphere from said inner tube, but without permitting the escape of the electrolyte, regardless of the inversion of said casing.

9. An electric storage battery including an invertible casing containing a plate compartment in its lower portion and a gas compartment in its upper portion; plates in said plate compartment having terminals extending exterior to said casing; a liquid electrolyte in said casing, in communication with said gas compartment; the quantity of said electrolyte being so limited that it cannot trap gas at the vent, in any position to which said casing may be turned; a vent device including an opening in a wall of said casing; an inner tube in communication with said opening extending in said gas compartment; an inclosure surrounding the inner end of said tube and having a perforation; whereby gas arising in said gas chamber from electrolytic action in said casing may escape through the tortuous passageway beginning with a perforation in said inclosure and terminating with said vent opening to the atmosphere from said inner tube, but without permitting the escape of the electrolyte, regardless of the inversion of said casing.

10. An electric storage battery including an invertible casing containing a plate compartment in its lower portion and a gas compartment in its upper portion; plates in said plate compartment having terminals extending exterior to said casing; a liquid electrolyte in said casing, in communication with said gas compartment; the quantity of said electrolyte being so limited that it cannot trap gas at the vent, in any position to which said casing may be turned; with a vent device including an opening in a wall of said casing and a plurality of conduits, extending one within the other, forming a tortuous passageway in communication with said vent opening.

11. An electric storage battery including an invertible rectangular casing containing a plate compartment in its lower portion and a gas compartment in its upper portion; a partition between said compartments permitting fluid communication between them; plates in said plate compartment held in operative position by said partition and having terminals extending exterior to said casing; a liquid acid electrolyte in said casing, covering said plates, extending above said partition, and in communication with said gas compartment; a vent device including an opening in one of the vertical walls of said casing extending parallel with said plates, an inner tube in communication with said opening extending horizontally in said gas compartment, transversely with respect to the planes of said plates, and above the latter; the inner end of said tube terminating in spaced relation with a wall of said casing apposed to the wall having said opening, an intermediate tube, surrounding said inner tube, in concentric relation therewith, rigidly connected at its opposite ends to said apposed walls; an outer tube, surrounding said inner and intermediate tubes, in eccentric relation therewith, rigidly connected at its opposite ends to said apposed walls; and perforations in said intermediate and outer tubes forming a tortuous passageway leading to said vent opening; whereby gas arising in said gas chamber from electrolytic action in said casing may escape through the tortuous passageway beginning with the perforations in said outer tube and terminating with said vent opening to the atmosphere from said inner tube, but without permitting the escape of the electrolyte, regardless of the inversion of said casing.

12. An electric storage battery including an invertible rectangular casing containing a plate compartment in its lower portion and a gas compartment in its upper portion; a partition between said compartments permitting fluid communication between them; plates in said plate compartment held in operative position by said partition and having terminals extending exterior to said casing; a liquid acid electrolyte in said casing, covering said plates, extending above said partition, and in communication with said gas compartment; the quantity of said electrolyte being so limited that it cannot trap gas at the vent, in any position to which said casing may be turned; a vent device including an opening in one of the vertical walls of said casing extending parallel with said plates, an inner tube in communication with said opening extending horizontally in said gas compartment, transversely with respect to the planes of said plates, and above the latter; the inner end of said tube terminating in spaced relation with a wall of said casing apposed to the wall having said opening, an intermediate tube, surrounding said inner tube, in concentric relation therewith, rigidly connected at its opposite ends to said apposed walls; an outer tube, surrounding said inner and intermediate tubes, in eccentric relation therewith, rigidly connected at its opposite ends to said apposed walls; and perforations in said intermediate and outer tubes forming a tortuous passageway leading to said vent opening; whereby gas arising in said gas chamber from electrolytic action in said casing may escape through the tortuous passageway beginning with the perforations in said outer tube and terminating with said vent opening to the atmosphere from said inner tube, but without permitting the escape of the electrolyte, regardless of the inversion of said casing.

13. An electric storage battery including an invertible casing containing a plate compartment in its lower portion and a gas compartment in its upper portion; plates in said plate compartment having terminals extending exterior to said casing; a liquid electrolyte in said casing, in communication with said gas compartment; the quantity of said electrolyte being so limited that it cannot trap gas at the vent, in any position to which said casing may be turned; the vent device including an opening in a wall of said casing; an inner tube in communication with said opening extending horizontally in said gas compartment, in communication therewith; the inner end terminating in spaced relation with the wall of said casing apposed to the wall having said opening; an inclosure surrounding said inner tube, and rigidly connected to said casing, having perforations upon respectively opposite sides thereof; whereby gas arising in said gas chamber from electrolytic action in said casing may escape through the tortuous passageway beginning with the perforations in said inclosure and terminating with said vent opening to the atmosphere from said inner tube, but without permitting the escape of the electrolyte regardless of the inversion of said casing.

In testimony whereof, we have hereunto signed our names at Philadelphia, Pennsylvania, this fourth day of March, 1914.

STOCKTON HETH MORTIMER.
VICTOR ROLES BOTTONE.

Witnesses:
ELSIE M. BETTSCH,
ROYAL T. MORRIS.